Feb. 6, 1951

J. E. GALL 2,540,110

BEARING ANGLE INDICATOR FOR
PLAN POSITION INDICATORS

Filed Sept. 10, 1948

INVENTOR.
JAMES E. GALL

BY

ATTORNEY

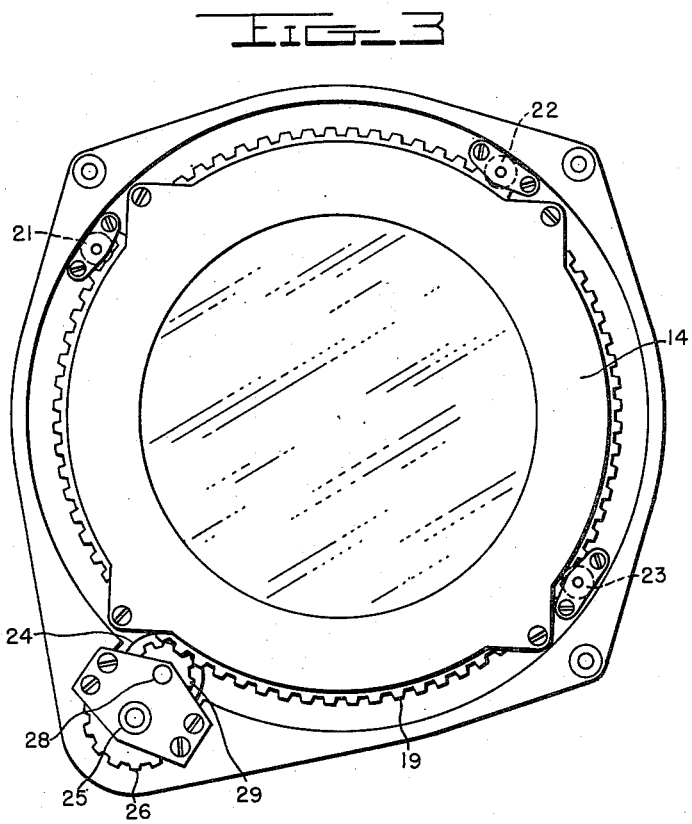
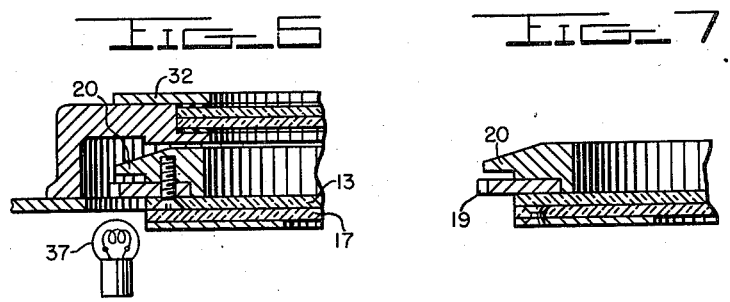

Feb. 6, 1951 J. E. GALL 2,540,110
BEARING ANGLE INDICATOR FOR
PLAN POSITION INDICATORS
Filed Sept. 10, 1948 3 Sheets-Sheet 3
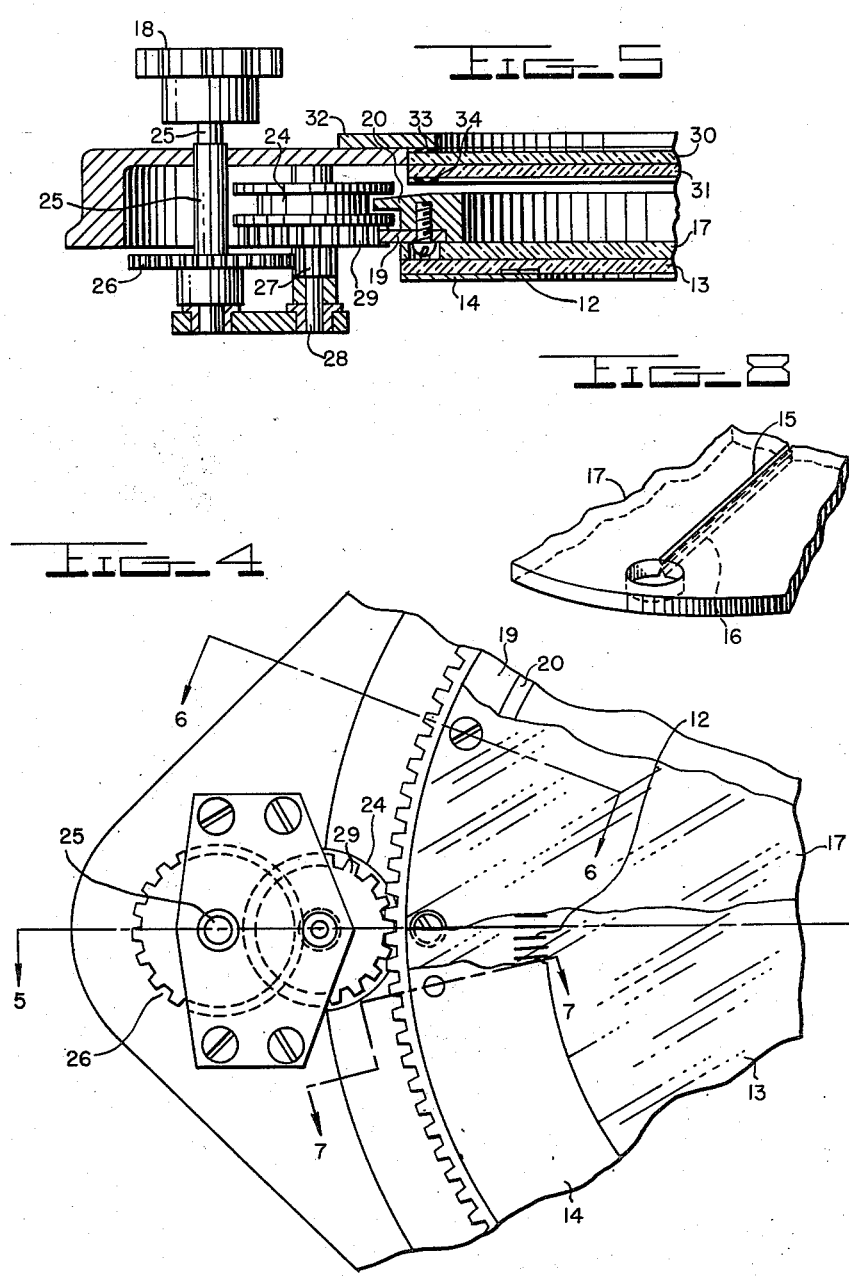
INVENTOR.
JAMES E. GALL
BY
ATTORNEY Patented Feb. 6, 1951

2,540,110

UNITED STATES PATENT OFFICE 2,540,110

BEARING ANGLE INDICATOR FOR PLAN POSITION INDICATORS

James E. Gall, Washington, D. C.

Application September 10, 1948, Serial No. 48,552

2 Claims. (Cl. 177—317)

(Granted under the act of March 3, 1883, as amended April 30, 1928; 370 O. G. 757)

The present invention relates to radar oscilloscopes of the plan position indicator type, and more particularly to a pointer structure therefor.

The invention seeks to provide a radar oscilloscope, or cathode ray oscilloscope used as a plan position indicator, with a pointer structure capable of superimposing upon the plan projection of targets a direction indicating line passing over any target indication to a surrounding graduated azimuth ring without obscuring even a small target image being operated upon or other surrounding target images.

Another object of the invention is to provide a light compact window frame structure for a plan position indicator carrying a pointer structure of the above type.

Another object is to provide a pointer structure and graduated circle therefor which may be lighted in a manner to render them readily visible without interfering with the visibility of the pattern on the fluorescent screen of an oscilloscope.

Another object is to provide a window with a pointer positioned by a hand operated gear arrangement suited to application of an electrical system for remotely controlling the positioning of similar indicators on repeater oscilloscopes to correspond with that of the original pointer.

Various other objects and advantages of the invention will become apparent from a perusal of the following specification and the drawings accompanying the same.

In the drawings:

Fig. 3 is a rear plan view of Fig. 1.

Fig. 4 is an enlarged fragmentary view of a portion of Fig. 3 near the driving gear.

Fig. 5 is a section on the line 5—5 of Fig. 4.

Fig. 6 is a fragmentary sectional view on the line 6—6 of Fig. 4.

Fig. 7 is a fragmentary sectional view on the line 7—7 of Fig. 4.

Fig. 8 is a fragmentary perspective view of the cursor disk showing the pointer structure.

Figure 1:
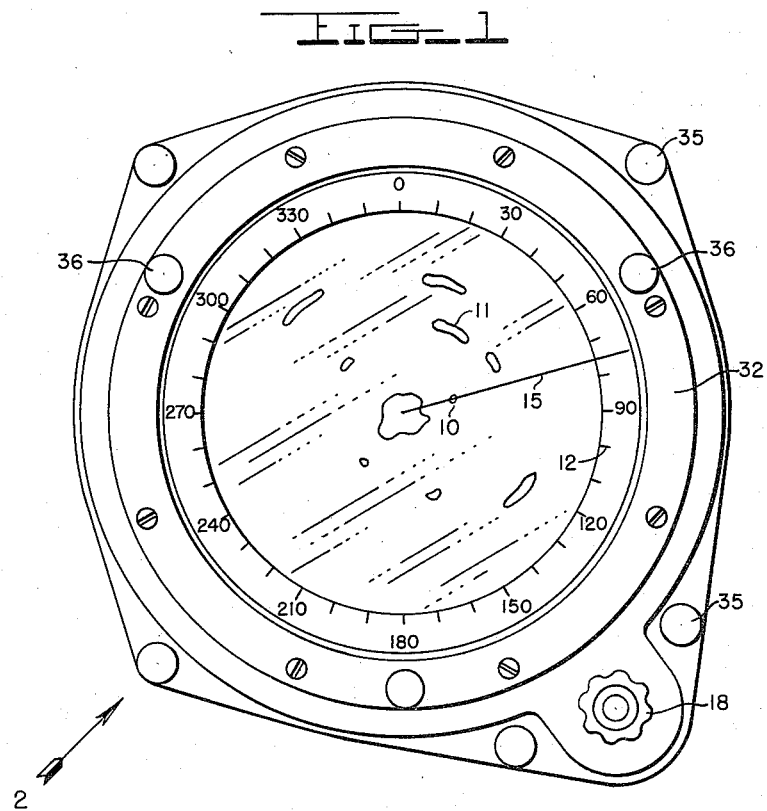
Fig. 1 is a front plan view of a preferred form of the window structure with a view therethrough of target images on the fluorescent screen of a radar oscilloscope.
Figure 2:
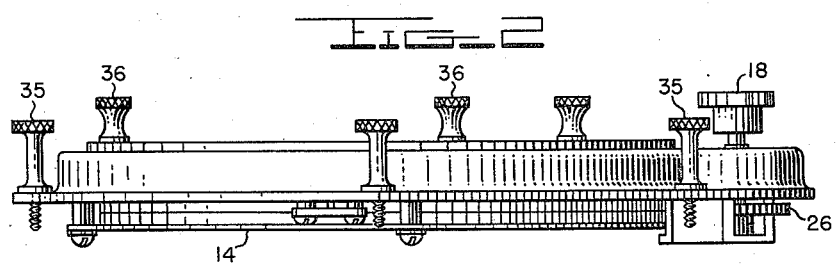
Fig. 2 is a side view of the window structure of Fig. 1 looking in the direction of the arrow 2 in Fig. 1.

Referring to the drawings in detail, and particularly to Fig. 1, this shows the complete window frame structure as it appears to a radar operator looking therethrough at the target images 10, 11 and others appearing on the fluorescent screen of a radar cathode ray oscilloscope. Graduations 12 preferably at one-degree intervals, but here shown at ten degree intervals, for the sake of simplicity, with numerals at thirty degree intervals are engraved in reverse on the interior or back face of a stationary disk 13 (Figs. 5 and 6) of clear colorless transparent material such as a clear plastic and of sufficient thickness to permit effective edge-illumination say of the order of three-sixteenths or five thirty-seconds of an inch, polished on both faces and the peripheral edge to assure transparency and effect internal reflection of light entering from the edge. Visibility of the graduations and numerals which pick up light from the interior of the transparent disk is enhanced by a dark colored, preferably black, background ring element 14 (Fig. 2). Lines 15 and 16 (Figs 1, 5 and 8) engraved at exactly the same angular position in the front and rear faces, respectively, of a transparent rotatable cursor disk 17 in the same axial plane, form the pointer element. The lines 15—16 being spaced in a plane perpendicular to the plane of the disk as indicated in Fig. 8 permit ease in reading their correct angular position without parallax. Like the stationary graduated disk 13, the cursor disk 17 is of clear colorless transparent material such as clear plastic of sufficient thickness to permit effective edge illumination and polished on both faces and the rim surface to enhance internal reflection. Thus the pointer element 15—16 may be softly illuminated by edge illumination of the disk. Such edge illumination of both the disks 13 and 17 may be accomplished in known manner as by the use of electric light bulbs situated to direct light into the disks as indicated at 37 in Fig. 6, mounted in any known or other suitable manner not shown.

The cursor disk 17 and consequently the pointer element 15—16 is rotated by the hand operated control knob 18 conveniently located on the window frame structure near the window opening, a step-up motion transmitting gear connection to be later described being provided between the shaft of the knob and the cursor disk to permit the disk to be rotated in the same direction as the knob and at an angular velocity preferably of about half that of the knob. For a clearer understanding of this connection reference is to be had to Figs. 3 to 7. The cursor disk is rotatably mounted by virtue of its being secured on a ring gear 19 carried on a bearing ring 20 which has bearing in a plurality of bearing sheaves 21, 22, 23 and 24 spaced around the window opening in the window frame. Motion is transmitted from the control knob 18 to the ring gear 19 by way of knob shaft 25 on which the knob is fixed, gear 26 fixed on shaft 25, pinion 27 fixed on jack shaft 28, gear 29 fixed on shaft 28 to ring gear 19. The transmission arranged as shown is proportioned in relation to the size of the ring gear to effect an angular movement of the ring gear of approximately one half that of the control knob 18 and in the same direction. Thus the large ring gear 19 may be rotated at a conveniently high angular velocity without the use of a large gear on the knob shaft, whereby compactness of the window frame structure is achieved. In the present cooperative proportioning and arrangement of elements the axis of the control knob is spaced from the axis of the ring gear a distance less than one and one half the radius of the ring gear. In the particular embodiment herein shown and described, the ring gear has a radius of approximately five inches, the intermediate gear 29, a radius of one half inch, the pinion 28, a radius of one eighth inch and the knob gear 26, a radius of five eighths inch. The large bearing sheave 24 rotates on the axis of the jack shaft 28 and in the present instance is fixed thereto although it may be free running on the shaft if desired. It is to be noted that the shaft 25 of the control knob may be extended and geared to an electrical system for remote control in known manner to maintain synchronism of the cursors of other repeater oscilloscopes.

A protective transparent light-filter cover comprised of the disks 30—31 of Lucite or other transparent material is provided to afford mechanical protection to the cursor disk and protection of the operator from the ultra violet constituent of light from the oscilloscope. A retaining ring or bezel 32 holds the filter disks 30—31 in place with intervening gaskets 33, 34. Thumb screws 35 are provided for securing the window structure to the case of the radar equipment with which it is to be used. Other thumb screws 36 threaded into the rim of the window structure are provided for securing to the window a suitable light shield or hood not shown.

While I have herein shown and described a preferred embodiment of the invention for the sake of disclosure it is to be understood that the invention is not limited to such specific embodiment but contemplates all such variants and modifications thereof as fall fairly within the scope of the appended claims.

The invention described herein may be manufactured and used by or for the government of the United States of America for governmental purposes without the payment of any royalties thereon or therefor.

What is claimed is:

1. A window structure for a radar oscilloscope of the plan position indicator type comprising a frame having a circular opening, a plurality of guide sheaves spaced circumferentially around the opening, a bearing ring journaled in said sheaves, a ring gear carried by said bearing ring in fixed relation thereto, a stationary disk of transparent material on the far side of the bearing ring and ring gear relative to an observer looking through the window opening, said disk having indicia engraved therein in a circular zone near the periphery, a transparent cursor disk overlying the bearing ring and ring gear and fixed thereto for rotation therewith, said cursor disk having a pair of parallel radial indicator lines engraved on opposite sides of the disk in a common axial plane and extending into overlapping relation with the circular zone of the said indicia, and means for rotating said ring gear whereby the said pair of radial lines viewed along said axial plane may be laid across the field of the oscilloscope over an image and over the said circular zone to determine the angle of bearing of the image.

2. A window structure for a radar oscilloscope of the plan position indicator type comprising a frame having a circular opening, a plurality of guide sheaves spaced circumferentially around the opening, a bearing ring journaled in said sheaves, a ring gear carried by said bearing ring in fixed relation thereto, a stationary disk of transparent material on the far side of the bearing ring and ring gear relative to an observer looking through the window opening, said disk having indicia engraved therein in a circular zone near the periphery, a transparent cursor disk overlying the bearing ring and ring gear and fixed thereto for rotation therewith, said cursor disk having a pair of parallel radial indicator lines engraved on opposite sides of the disk in a common axial plane and extending into overlapping relation with the circular zone of the said indicia, said disks having polished edges to facilitate edge illumination for the indicia and indicator lines and said stationary disk having an opaque dark colored ring-form backing element for the indicia, and means for rotating said ring gear whereby the said pair of radial lines viewed along said axial plane may be laid across the field of the oscilloscope over an image and over the said circular zone to determine the angle of bearing of the image.

JAMES E. GALL.

REFERENCES CITED

The following references are of record in the file of this patent:

UNITED STATES PATENTS

| Number | Name | Date |
|---|---|---|
| 2,413,214 | Carlson | Dec. 24, 1946 |
| 2,427,686 | Muller | Sept. 23, 1947 |
| 2,465,354 | Clark | Mar. 29, 1949 |

FOREIGN PATENTS

| Number | Country | Date |
|---|---|---|
| 519,346 | Great Britain | Oct. 14, 1938 |